(12) United States Patent
Wang et al.

(10) Patent No.: US 7,978,249 B2
(45) Date of Patent: Jul. 12, 2011

(54) IMAGE CAPTURING DEVICE AND AUTO-FOCUS METHOD FOR SAME

(75) Inventors: Wei-Jen Wang, Taipei Hsien (TW); Shih-Pao Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 777 days.

(21) Appl. No.: 11/946,361

(22) Filed: Nov. 28, 2007

(65) Prior Publication Data

US 2009/0096913 A1  Apr. 16, 2009

(30) Foreign Application Priority Data

Oct. 10, 2007  (CN) .......................... 2007 1 0201989

(51) Int. Cl.
*G02B 13/16* (2006.01)
*H04N 5/225* (2006.01)

(52) U.S. Cl. ......... 348/335; 348/340; 348/345; 348/348

(58) Field of Classification Search .................. 348/335, 348/340, 345, 348; 396/121
See application file for complete search history.

(56) References Cited

U.S. PATENT DOCUMENTS

| 4,931,820 A | 6/1990 | Matsuzawa et al. |
| 2006/0290932 A1* | 12/2006 | Kawanami ................... 356/370 |
| 2007/0018088 A1* | 1/2007 | Huang et al. ................. 250/239 |
| 2008/0002048 A1* | 1/2008 | Ito et al. ....................... 348/345 |

FOREIGN PATENT DOCUMENTS

CN   1464323 A   12/2003

* cited by examiner

*Primary Examiner* — Yogesh K Aggarwal
(74) *Attorney, Agent, or Firm* — Jeffrey T. Knapp

(57) ABSTRACT

An image capturing device includes a taking lens, an image sensor, an image processing unit, an input device, a processor, and a driving unit for moving the taking lens. The image processing unit is configured for receiving the electrical signals from the image sensor and obtaining image information of each image. The input device is configured for selecting focus areas in a photographing area and setting a focus power of each of the focus areas. The processor is configured for performing an auto-focus process using a base evaluation value of an image of the photographing area, wherein the base evaluation value is calculated by taking the total of multiplying an evaluation value of each of the focus areas and non-focus areas of the photographing area by the focus power corresponding to said each of the focus areas and a focus power corresponding to each of the non-focus areas.

18 Claims, 3 Drawing Sheets

IMAGE CAPTURING DEVICE AND AUTO-FOCUS METHOD FOR SAME

TECHNICAL FIELD

The present invention relates to an image capturing device and auto-focus method for the image capturing device, and, particularly, to an image capturing device which focuses by using a multi-area auto-focus method.

DESCRIPTION OF RELATED ART

With the ongoing development of optical imaging technology, image capturing devices are widely used in electronic devices such as digital cameras and mobile phones. At present, most image capturing devices have an auto-focus function.

Cameras including digital cameras normally have an AF (auto-focus) function that shows a user a focus frame at a predetermined position on an electronic view finder (usually, at its center). For example, the focus frame is shown on a liquid crystal monitor, thereby informing the user that the camera is now focused on that part of an object whose image is surrounded by the focus frame. Some digital cameras perform the focusing operation in accordance with a contrast detection system based on many data points within multiple fixed focus areas of an image. Therefore if an object that a user wants to take a picture of is not in the predetermined area of the electronic view finder, the image of the object in the photo captured later may not be clear.

What is needed, therefore, is an image capturing device that can overcome the above-described shortcomings.

SUMMARY

In accordance with one present embodiment, an image capturing device includes a taking lens, an image sensor, an image processing unit, an input device, a processor, and a driving unit for moving the taking lens. The image sensor is configured for converting light transmitted through the taking lens to electrical signals. The image processing unit is configured for receiving the electrical signals from the image sensor and obtaining image information of each image represented by the electrical signals. The input device is configured for selecting at least one focus area in a photographing area formed by the taking lens and setting a focus power of each of the at least one focus area. The processor is configured for performing an auto-focus process using a base evaluation value of an image of the photographing area, wherein the base evaluation value is calculated by taking the total of multiplying an evaluation value of each of the at least one focus area and at least one non-focus area of the photographing area by the focus power corresponding to said each of the at least one focus area and a focus power corresponding to the at least one non-focus area.

Other novel features and advantages will become more apparent from the following detailed description when taken in conjunction with the accompanying drawings.

BRIEF DESCRIPTION OF THE DRAWINGS

Many aspects of the present image capturing device and related method can be better understood with reference to the following drawings. The components in the drawing are not necessarily drawn to scale, the emphasis instead being placed upon clearly illustrating the principles of the present image capturing device and related method.

DETAILED DESCRIPTION OF THE EMBODIMENTS

Embodiments of the present invention will now be described in detail below, with reference to the drawings.

Figure 1:
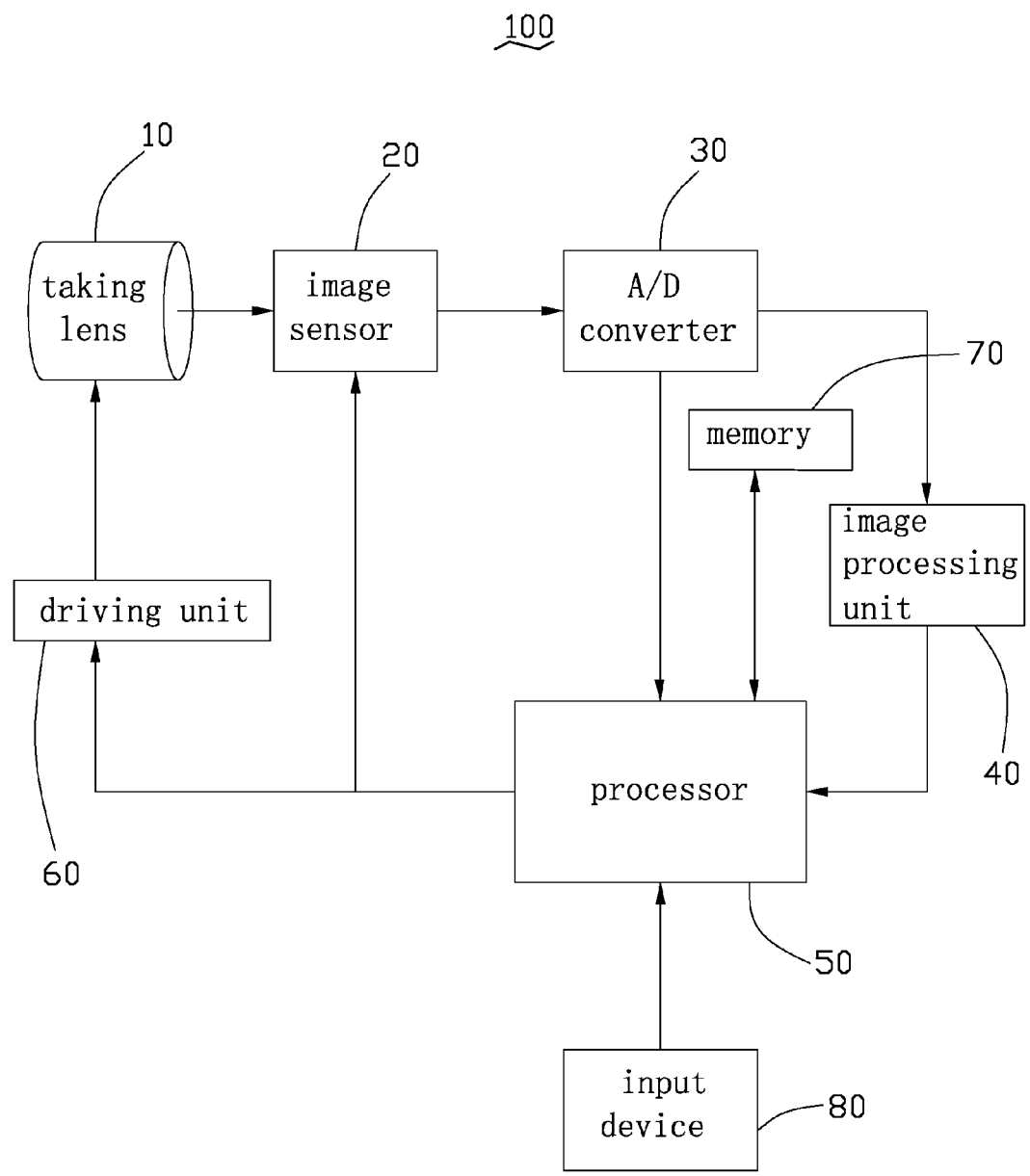
FIG. 1 is a functional block diagram of an image capturing device according to a present embodiment.

Referring to FIG. 1, an image capturing device 100, according to one embodiment, is shown. The image capturing device 100 includes a taking lens 10, an image sensor 20, an analog/digital (A/D) converter 30, an image processing unit 40, a processor 50, a driving unit 60, a memory 70, and an input device 80. The image capturing device 100 can for example be a digital camera, a video camera, or a mobile phone with image capturing function.

The taking lens 10 can include many lenses capable of being divided into several lens groups. The taking lens 10 can be a zoom lens or a lens with a fixed focal length.

The image sensor 20 is configured for converting light transmitted through the taking lens 10 to electrical signals. The image sensor 20 is typically a charge-coupled device (CCD) or a complementary metal oxide semiconductor (CMOS) device. The image sensor 20 can further be selected from a group consisting of a ceramic leaded chip carrier (CLCC) package type image sensor, a plastic leaded chip carrier (PLCC) package type image sensor, and a chip scale package (CSP) type image sensor.

The A/D converter 30 can convert the electrical signals output from the image sensor 20 into digital electrical signals, in order that the electrical signals can easily be processed later.

The image processing unit 40 receives the digital electrical signals converted by the A/D converter 30, and can obtain image information of each image represented by the electrical signals.

Figure 2:
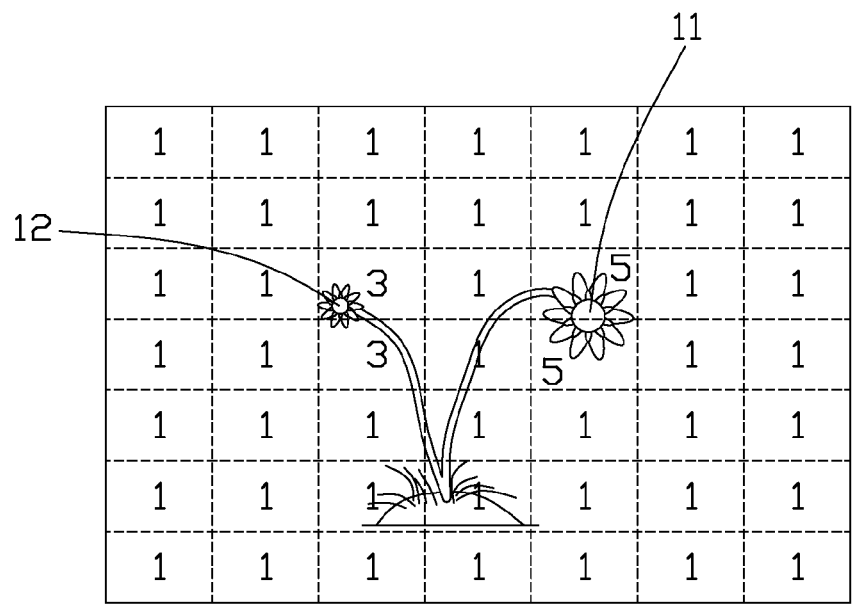
FIG. 2 shows focus areas of an image shown in a view finder of the image capturing device of FIG. 1.

The input device 80 is used for selecting focus areas in a photographing area formed by the taking lens 10 before an image of the photographing area is captured. In the present embodiment, the input device 80 is a touch screen, which can also be used as a view finder of the image capturing device 100. Preferably, the touch screen is a liquid crystal monitor. Thus, users can select focus areas on the touch screen intuitively. Preferably, users can also set focus powers of these areas to select primary focus areas and subordinate focus areas. Referring to FIG. 2, this shows an image of a plant with two flowers 11 and 12. A user may want to select the flower 11 as a primary photo object, and the flower 12 as a subordinate photo object. In order to achieve that aim, focus areas in the photographing area surrounding the flowers 11 and 12 are selected, and then focus powers for the focus areas surrounding the flowers 11 and 12 is set. Preferably, a focus power for the non-focus areas of the photographing area besides the selected focus areas can also be set. In order that users can set focus powers for the photographing area easily, the focus power of the non-focus areas of the photographing area can be a predetermined default value. In the illustrated example, the value of the focus power of the focus areas surrounding the flowers 11 is set as 5, the value of the focus power of the focus areas surrounding the flowers 12 is set as 3, and the value of the focus power of the non-focus areas of the photographing area is set as 1. It is to be understood that the focus power of the non-focus areas of the photographing area can instead be set as any other value, such as 0.

The memory 70 is configured for storing the selected focus areas in the photographing area, and setting focus powers corresponding to the focus areas and non-focus areas of the photographing area.

The processor 50 can receive image information from the image processing unit 40, and receive information regarding the selected focus areas and the non-focus areas and corresponding focus powers of the focus areas and the non-focus areas from the memory 70. The processor 50 calculates a base evaluation value of an image of the photographing area. This is obtained by taking the total of multiplying a base evaluation value of each focus area and non-focus area by the focus power corresponding to the area. The base evaluation value of each area can be contrast, grayscale, or intensity of the area. The processor 50 can control the auto-focus operation of the image capturing device 100 to detect an in-focus position of the taking lens 10 using the base evaluation value. The method of detecting the in-focus position of the taking lens 10 can be any of various kinds of known methods, such as a hill-climbing method.

The driving unit 60 is configured for moving the taking lens 10 back and forth under control of the processor 50. The driving unit 60 moves the taking lens 10 during the process of detecting the in-focus position of the taking lens 10, and moves the taking lens 10 to the in-focus position once the in-focus position of the taking lens 10 has been detected.

Figure 3:
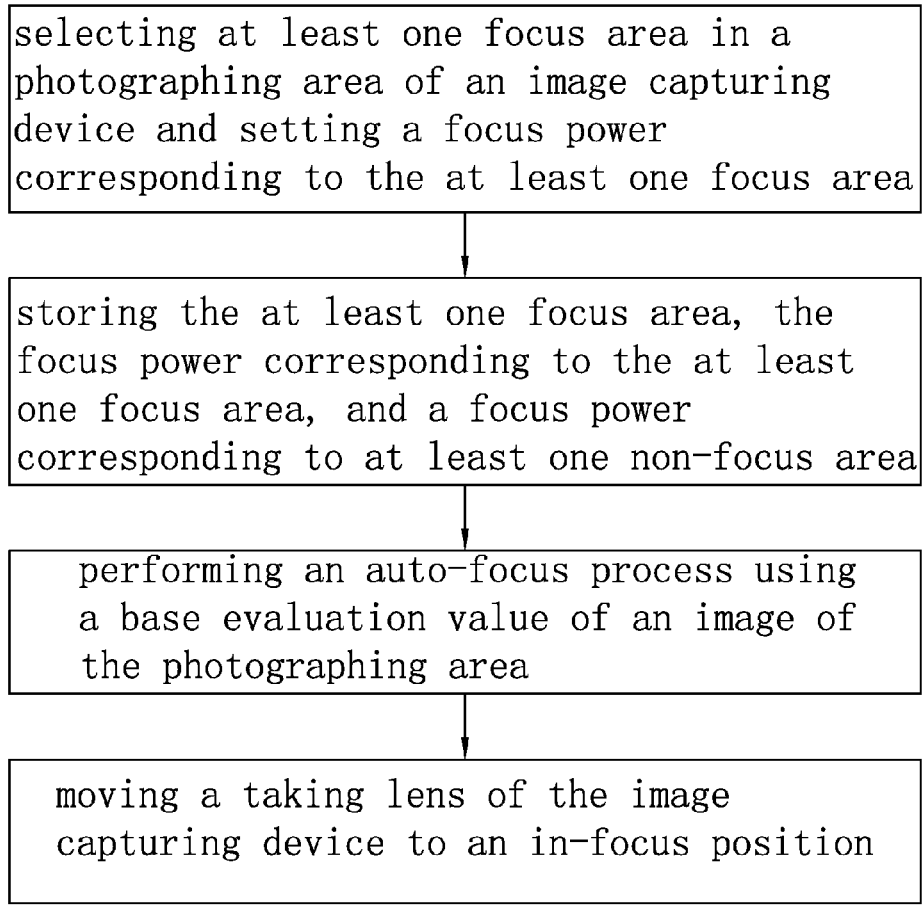
FIG. 3 is a flow chart of an auto-focus method for an image capturing device according to a present embodiment.

Referring to FIG. 3, a flow chart of an auto-focus method for the image capturing device 100 is shown. The method includes the steps of: selecting focus areas in a photographing area of the image capturing device, and setting focus powers corresponding to the focus areas and non-focus areas of the photographing area; storing the focus areas and focus powers corresponding to the focus areas and the non-focus areas; performing an auto-focus process using a base evaluation value of an image of the photographing area, wherein the base evaluation value is calculated by taking the total of multiplying a base evaluation value of each focus area and non-focus area by the focus power corresponding to the area; and moving the taking lens 10 to an in-focus position.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. An image capturing device comprising:
    a taking lens;
    an image sensor configured for converting light transmitted through the taking lens to electrical signals;
    an image processing unit configured for receiving the electrical signals from the image sensor and obtaining image information of each image represented by the electrical signals;
    an input device configured for selecting a plurality of focus areas in a photographing area formed by the taking lens and setting a focus power of each of the plurality of focus areas, wherein the input device comprises a touch screen which is used as a view finder of the image capturing device;
    a processor configured for performing an auto-focus process using a base evaluation value of an image of the photographing area, wherein the base evaluation value is calculated by taking the total of multiplying an evaluation value of each of the plurality of focus areas and the at least one non-focus area of the photographing area by the focus power corresponding to said each of the plurality of focus areas and a focus power corresponding to the at least one non-focus area; and
    a driving unit configured for moving the taking lens.

2. The image capturing device as claimed in claim 1, wherein the image capturing device is selected from the group consisting of a digital camera, a video camera, and a mobile phone.

3. The image capturing device as claimed in claim 1, wherein the image sensor is one of a charge-coupled device and a complementary metal oxide semiconductor device.

4. The image capturing device as claimed in claim 1, wherein the image sensor is selected from the group consisting of a ceramic leaded chip carrier package type image sensor, a plastic leaded chip carrier package type image sensor, and a chip scale package type image sensor.

5. The image capturing device as claimed in claim 1, wherein the base evaluation value of the plurality of focus areas and the at least one non-focus area is selected from the group consisting of contrast, grayscale, and intensity.

6. The image capturing device as claimed in claim 1, further comprising an analog/digital converter configured for converting the electrical signals output from the image sensor into digital electrical signals, which are then received by the image processing unit.

7. The image capturing device as claimed in claim 1, further comprising a memory configured for storing the selected plurality of focus areas in the photographing area, the set focus power corresponding to the plurality of focus areas, and the focus power corresponding to the at least one non-focus area.

8. The image capturing device as claimed in claim 1, wherein the focus powers of the focus areas are different.

9. The image capturing device as claimed in claim 1, wherein the input device is further configured for setting a focus power of the at least one non-focus area of the photographing area.

10. The image capturing device as claimed in claim 1, wherein the focus power corresponding to the at least one non-focus area of the photographing area is a predetermined default value.

11. The image capturing device as claimed in claim 10, wherein the predetermined default value is 0.

12. An auto-focus method for an image capturing device, the method comprising:
    selecting a plurality of focus areas in a photographing area of an image capturing device and setting a focus power corresponding to each of the plurality of focus areas through a touch screen;
    storing the plurality of focus areas, the focus power corresponding to the plurality of focus areas, and a focus power corresponding to at least one non-focus area of the photographing area;
    performing an auto-focus process using a base evaluation value of an image of the photographing area, wherein the base evaluation value is calculated by taking the total of multiplying a base evaluation value of each of the plurality of focus areas and the at least one non-focus area by the focus power corresponding to said each of the plurality of focus areas and the at least one non-focus area; and
    moving a taking lens of the image capturing device to an in-focus position.

13. The method as claimed in claim 12, wherein the image capturing device is selected from the group consisting of a digital camera, a video camera, and a mobile phone.

14. The method as claimed in claim 12, wherein the base evaluation value of the plurality of focus areas and the at least one non-focus area is selected from the group consisting of contrast, grayscale, and intensity.

15. The method as claimed in claim 12, wherein the focus powers of the focus areas are different.

16. The method as claimed in claim 12, further comprising setting the focus power corresponding to the at least one non-focus area.

17. The method as claimed in claim 12, wherein the focus power of the at least one non-focus area is a predetermined default value.

18. The method as claimed in claim 17, wherein the predetermined default value is 0.

* * * * *